(12) United States Patent
Nichols

(10) Patent No.: US 7,664,133 B2
(45) Date of Patent: Feb. 16, 2010

(54) HIGH LEVEL MESSAGE PRIORITY ASSIGNMENT BY A PLURALITY OF MESSAGE-SENDING NODES SHARING A SIGNAL BUS

(75) Inventor: Steven C. Nichols, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 439 days.

(21) Appl. No.: 11/316,122

(22) Filed: Dec. 22, 2005

(65) Prior Publication Data

US 2006/0098682 A1    May 11, 2006

Related U.S. Application Data

(63) Continuation of application No. 09/777,632, filed on Feb. 6, 2001, now Pat. No. 7,012,927.

(51) Int. Cl.
H04L 12/413 (2006.01)
H04J 3/02 (2006.01)
H04J 3/16 (2006.01)

(52) U.S. Cl. .................. 370/447; 370/462; 370/465

(58) Field of Classification Search ................ 370/445, 370/447, 461, 462
See application file for complete search history.

(56) References Cited

U.S. PATENT DOCUMENTS

| | | | |
|---|---|---|---|
| 4,654,889 A | 3/1987 | Shutterly |
| 4,745,596 A | 5/1988 | Sata |
| 4,785,453 A | 11/1988 | Chandran et al. |
| 5,001,642 A | 3/1991 | Botzenhardt et al. |
| 5,105,441 A | 4/1992 | Borst et al. |
| 5,111,460 A | 5/1992 | Botzenhardt et al. |
| 5,175,821 A | 12/1992 | Dutcher et al. |
| 5,293,571 A | 3/1994 | Matsuda et al. |
| 5,303,348 A | 4/1994 | Botzenhardt et al. |

(Continued)

FOREIGN PATENT DOCUMENTS

EP    1020784    7/2000

(Continued)

OTHER PUBLICATIONS

Jean-Lien C. Wu, et al., Practical Aspects and Experiences. A New Bus Contention Scheme in s/net with Dynamic Priority; Parallel Computing, Elsevier Publishers, Amsterdam, NL, vol. 20, No. 7, pp. 1045-1046, Jul. 1, 1994.

(Continued)

Primary Examiner—Nittaya Juntima

(57) ABSTRACT

A system has a plurality of nodes communicating with each other on a serial data path using dominant and recessive signal levels. A dominant signal level sent on the data path by any of the nodes creates a dominant signal level on the data path irrespective of the number of recessive signal levels sent by other nodes. The dominant and recessive signal levels form a series of bits organized into messages by the nodes. Each sending node senses the signal level on the data path bit by bit, and if different from that sent by that sending node, halts further sending of signal levels by that sending node. A priority value generator in each node provides a priority signal encoding a value whose magnitude indicates a relative priority. A message priority module in each node receives the priority signal, and stores the priority value in predetermined leading bits of the message to be sent.

24 Claims, 4 Drawing Sheets

U.S. PATENT DOCUMENTS

| | | | |
|---|---|---|---|
| 5,398,243 A | | 3/1995 | Aguilhon et al. |
| 5,499,247 A | | 3/1996 | Matsuda et al. |
| 5,572,658 A | * | 11/1996 | Mohr et al. .................. 714/4 |
| 5,617,545 A | | 4/1997 | Ogata et al. |
| 5,717,795 A | | 2/1998 | Sharma et al. |
| 5,740,353 A | | 4/1998 | Kreulen et al. |
| 5,805,614 A | | 9/1998 | Norris |
| 5,812,556 A | | 9/1998 | Schmidt |
| 5,854,454 A | | 12/1998 | Upender et al. |
| 5,856,976 A | | 1/1999 | Hirano |
| 6,111,673 A | | 8/2000 | Chang et al. |
| 6,167,057 A | | 12/2000 | Kishigami et al. |
| 6,353,775 B1 | | 3/2002 | Nichols |
| 6,434,112 B1 | | 8/2002 | Kwon |
| 6,448,901 B1 | | 9/2002 | Adams et al. |
| 2002/0146031 A1 | | 10/2002 | Nichols |

OTHER PUBLICATIONS

P. Hank et al., SJA1000 Stand-Alone CAN Controller; Phillips, Application note; Sections 2., 4.2, 5.2-5.4, Dec. 15, 1997.

D. John Oliver, "Implementing the J1850 Protocol", Intel Corporation, p. 1-15. http://www:intel.com/design/intarch/papers/j1850_wp.pdf.

* cited by examiner

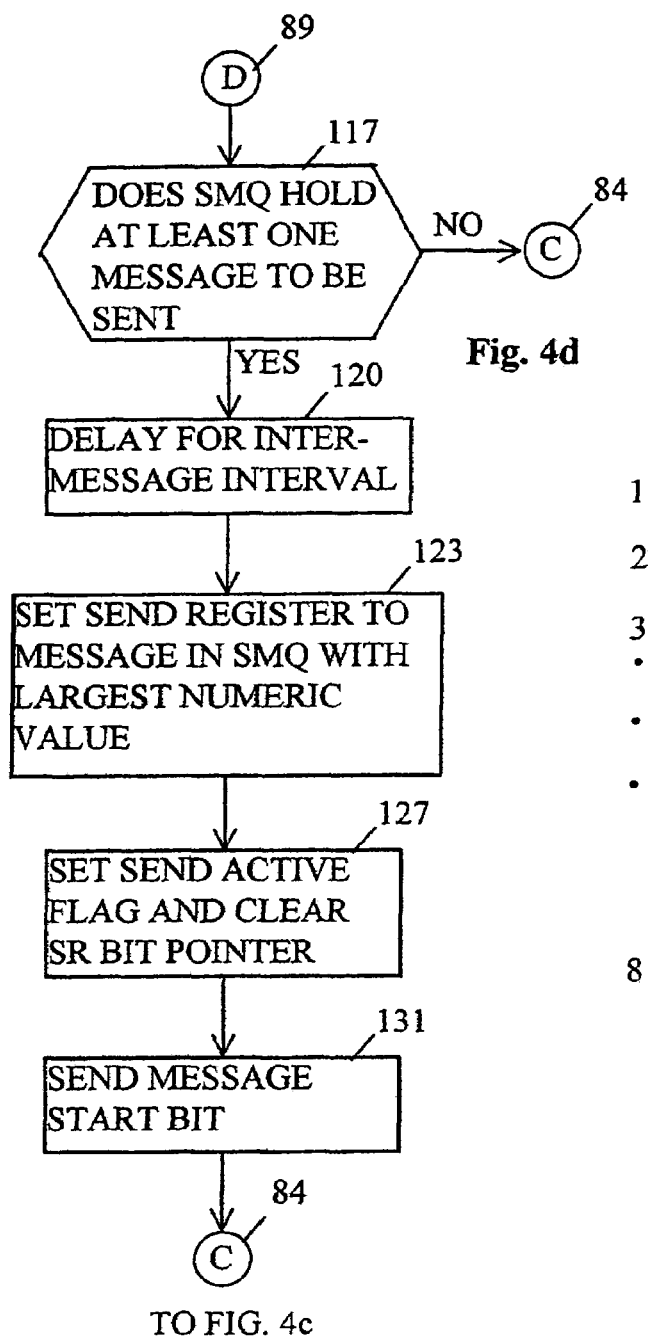

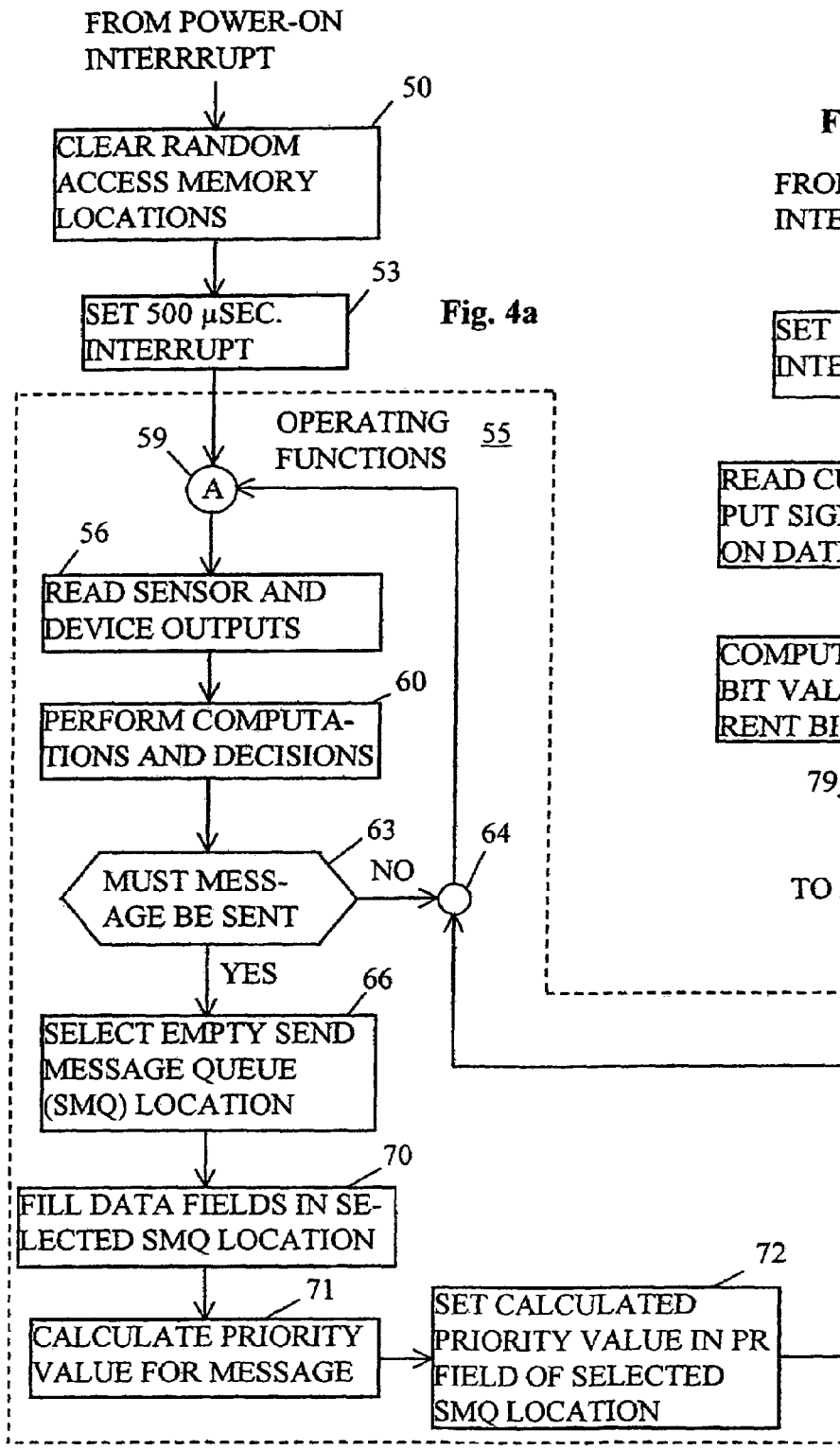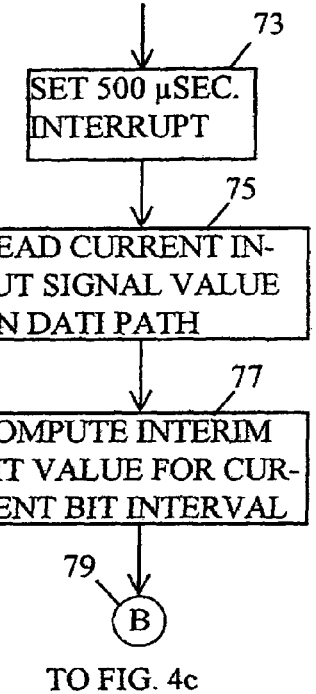

HIGH LEVEL MESSAGE PRIORITY ASSIGNMENT BY A PLURALITY OF MESSAGE-SENDING NODES SHARING A SIGNAL BUS

CROSS REFERENCE TO RELATED APPLICATIONS

This is a continuation of application Ser. No. 09/777,632 filed Feb. 6, 2001 U.S. Pat. No. 7,012,927 issued Mar. 14, 2006, the content of which is incorporated herein by reference in its entirety.

These US patents contain matter pertinent to this application and are hereby incorporated by reference into this application:

"AC Synchronization With Miswire Detection for a Multi-Node Serial Communication System" having a common assignee with this application, having Ser. No. 09/658,794, and filed on Sep. 11, 2000 with John T. Adams, et al. as applicants, now U.S. Pat. No. 6,373,376 hereafter the "Miswire" patent.

"Status Indicator For an Interface Circuit For a Multi-Node Serial Communication System" having a common assignee with this application, having Ser. No. 09/659,153, and filed on Sep. 11, 2000 with John T. Adams, et al. as applicants, now U.S. Pat. No. 6,448,901 hereafter the "Indicator" patent.

BACKGROUND OF THE INVENTION

The powerful functionality and low cost of small, relatively powerful microprocessors and microcontrollers has resulted in their expansion into a variety of new uses. Where formerly microprocessors were used mainly for relatively complex tasks, their low cost now allows them to substitute at lower cost for conventional or special purpose circuits. At the same time, their power allows them to handle additional functions in a particular application that conventional circuits cannot.

One situation where this is particularly true is in distributed control or process management. Imagine a system where there are a large number of different functions that are performed at various locations throughout the system, and which functions must be coordinated with each other. Some of these functions are requests or initiations of actions, perhaps by a human, perhaps by another node in response to a detected condition. Others are the actions themselves.

The modem auto is a pertinent example. There are literally scores of different electrical functions that are initiated at various places throughout an automobile. A few of these functions are locking and unlocking doors, handling engine functions such as ignition and fuel injection, sensing and displaying status such as speed and oil pressure, indicating burned out lights and improperly closed doors, sensing accelerator position, etc. The conventional approach dedicates one or more conductors to each of these functions. For example, a wire directly connects a door lock with the switch that opens that lock, a wire connects the oil pressure gauge with the oil pressure sensor, a wire connects the door covering the fuel cap to the switch that opens it, and wires run from the ignition control to each of the ignition components. A moment's consideration shows that an automobile using such conventional connections of these related functions requires perhaps hundreds of dedicated wires.

This conventional structure has a number of disadvantages particularly in automated or semi-automated assembly. In the first place, failed or defective dedicated wires are expensive to correct. How can one easily run a replacement wire from the dashboard to the trunk? The large number of wires makes miswiring easy during manufacture not least because color coding a large number of individual wires is complicated and expensive. The sheer number of wires connecting components located throughout the automobile becomes expensive to provide and install. The large number of wires occupies a significant volume within the auto. As the number of wires in an auto increases, the wires become increasingly vulnerable to damage or failure for a variety of reasons, and leading to less reliability. Other systems both more complicated and less complicated than autos, have similar problems with handling the proliferation of wires between the various functional elements.

One solution to many of these problems makes use of the previously mentioned microprocessors. Instead of dedicated wires between related components, a single serial signal path often comprising a pair of signal wires, and a single power wire pair are connected to all or at least a group of the components. Each component includes a communicator or node that can send messages to and receive messages from the other components' nodes on the signal path. Each node receives every message on the signal wires and uses the messages appropriate for operating its component.

A problem recognized for a very long time is that of message collisions, where two or more nodes send messages on the signal wires at the same time. One solution is that of the CAN (controller area network) system. In the CAN system, messages are encoded in binary signals that are either dominant or recessive bits. If a communicator sends a dominant bit signal, the dominant bit is present on the signal path regardless of the number of recessive bits sent by other communicators. Each communicator senses the signal on the signal path, and ceases sending its message if, when sending a recessive bit, the node senses a dominant bit. This process of each node detecting collisions and ceasing message sending upon detecting a collision is called arbitration. The CAN system is explained in more detail in U.S. Pat. Nos. 5,001,642 and 5,303,348.

Typically, each type of message has a unique leading ID portion. This assures that eventually only one message survives arbitration. The node sending the surviving message continues sending until the message is completed, at which time all of the nodes wait for a short period of time, and then as many as have messages to send, start sending new messages.

One problem with the CAN system is assuring that every node has an opportunity to complete its messages. If the signal path is fully occupied by messages having ID portions with dominant bits early in the message, then other messages will be delayed excessively. Of course, if there is so much signal path traffic that not every signal can be sent, then the system is overloaded, and potentially important messages will never be sent. We assume that the system is not overloaded long term, but may have brief periods where a number of nodes have messages that have lost arbitration.

The ID portions assigned to particular messages have inherent priority in them, in that earlier and greater number of dominant bits in a message assure higher priority for that message relative to messages not having ID's with as many and early dominant signals. But we still find that some messages are not sent as promptly as we prefer. We also find that the fixed priority inherent in the assigned ID format is not flexible enough for some types of system operation.

BRIEF DESCRIPTION OF THE INVENTION

To address these problems in a system of a plurality of nodes communicating with each other on a serial data path using dominant and recessive signal levels, we provide a variable priority value which forms the leading bits of each message. In this system, a dominant signal level sent on the data path by any of the nodes creates a dominant signal level on the data path irrespective of the number of recessive signal levels sent by other nodes. The dominant and recessive signal levels form a series of bits organized into messages. Each sending node senses the signal level on the data path bit by bit, and if different from that sent by that sending node, halts further sending of signal levels by that sending node for the rest of that message. Each sending node while sending a message identifies the end thereof. Each node includes i) a send register for recording a message in bit format ordered from leading to trailing bits for sending on the data path and for providing a message signal encoding the message bit format, and ii) a message-sending module receiving the message signal and modulating the signal levels on the data path to create dominant and recessive signal levels encoding the message bit format in order from leading to trailing bits thereof. The message-sending module begins to send each message in preselected time relationship to the end of the previous message.

Each node of the system includes a priority value generator providing a priority signal encoding a value whose magnitude indicates a relative priority, and a message priority module receiving the priority signal, and storing the priority value in the leading bits of the message register. By arbitrating on the priority value in each message, the system allows messages with higher priority values to complete transmission before those with lower priority values. The priority value in a message can be changed or set in response to the importance of the message or on the basis of the number of times that the message has lost arbitration.

BRIEF DESCRIPTION OF THE DRAWINGS

FIG. 3 shows the format of a Send Message Queue useful for the nodes of FIG. 1.

FIGS. 4a-4d together form a flowchart of software executed by the data processors in the nodes of FIG. 1 in implementing the invention.

DESCRIPTION OF THE PREFERRED EMBODIMENT

Figure 1:
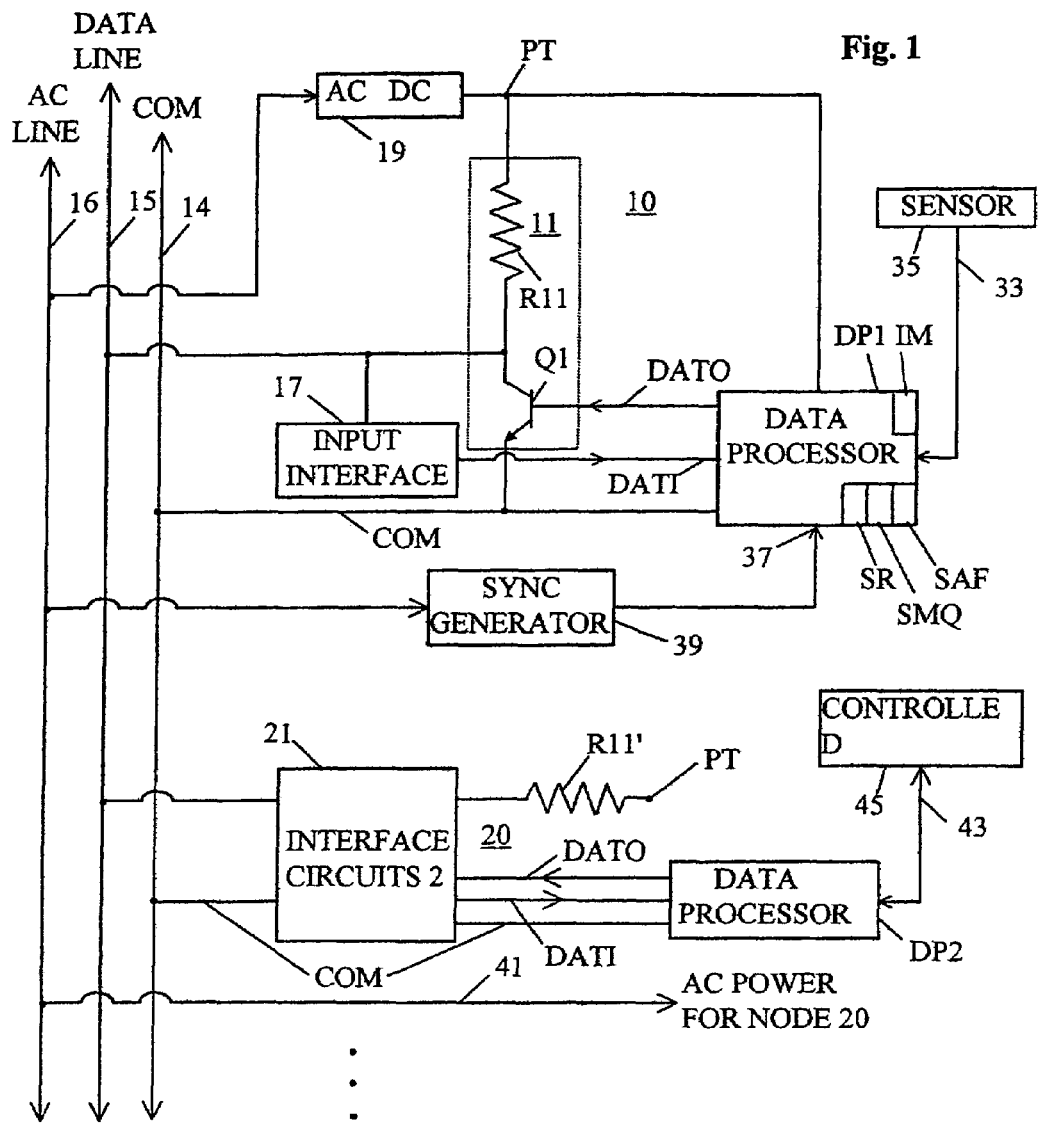
FIG. 1 is a block diagram of a system formed of nodes employing the invention.

The block diagram of FIG. 1 shows two similar nodes 10 and 20 of a serial communication system. Node 10 is shown in greater detail than is node 20. A typical system may have dozens of nodes similar to nodes 10 and 20. Some nodes will control mechanical or electrical devices such as device 45 shown connected to data processor DP2. Others, like node 10, will receive a sensor signal from sensor 35 on path 33. Some nodes may do both.

In the embodiment here, all of the nodes 10, 20, etc. receive electrical power from an AC line 16 and a common line 14. In the commercial system for which this invention is intended, many of the devices controlled by the individual nodes operate on 24 v. AC power, so it is most convenient to use this available power for the nodes as well. And AC power has advantages in synchronizing operation of nodes 10, 20, etc. with each other. Further, using system-wide AC power distribution with a local AC to DC converter 19 in each node 10, 20, etc. provides further advantages in allowing miswiring detection as explained in the "Miswire" application. It is of course, also possible to use a single system AC to DC converter to provide system-wide DC power to each node on lines 14 and 16.

One further issue regarding the power for the individual nodes: I have simplified the power conversion circuitry shown in FIG. 1 from that actually used in the preferred embodiment. The preferred embodiment for this invention is as shown in the "Miswire" and the "Indicator" applications. People with even elementary skill in the art will find it easy to incorporate the full wave rectifier converter of these applications into the circuit of FIG. 1.

The nodes 10, 20, etc. are connected for data transfers to a serial data line 15 and the common line 14. As is typical, a series of voltage level changes across lines 14 and 15 encode the data to be transferred. In the CAN protocol explained above, one voltage level is designated as dominant, the other as recessive. In the embodiment of FIG. 1, a voltage near 0 v. is the dominant level and a positive voltage of a few volts is the recessive level.

Figure 2:
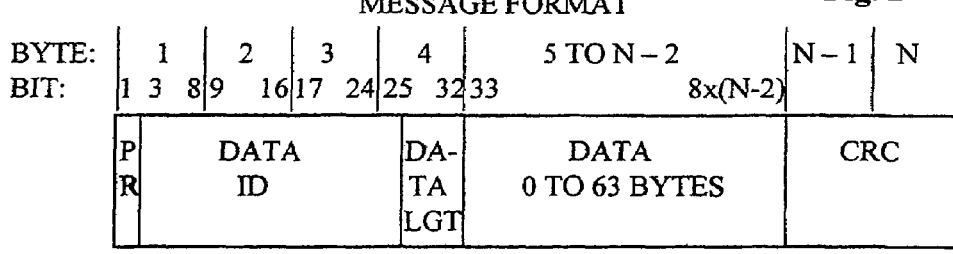
FIG. 2 shows the format of individual messages sent and received by the nodes of FIG. 1.

Data is transmitted on line 15 in messages having in our commercial embodiment, a preselected format shown in FIG. 2. A message is transmitted serially, starting with the leftmost bit and proceeding bit by bit to the right. The individual fields have the following names, sizes, and purposes:

| NAME | SIZE | MEANING/PURPOSE |
| --- | --- | --- |
| PR (Priority) | 2 bits | Message priority |
| DATA ID | 24 bits | Identifies content/purpose of message |
| DATA LGT | 6 bits | No. of total bytes in message |
| DATA | 0-63 bytes | Data carried by message |
| CRC | 2 bytes | Cyclic redundancy code for error detection |

Note that the bits of each message are number in ascending order left to right, and this is the order in which the message is sent. A SR bit pointer is incremented after each bit is successfully sent to point at the next bit to be sent.

Node 10 illustrates a typical structure for each of the nodes in the FIG. 1 system. The individual nodes each have the AC to DC converter 19 supplying DC power at terminal PT for operating the node's electronics as well as for applying signals to data line 15 for transmitting data to other nodes 20, etc. An input interface 17 converts the voltage across data line 15 and common line 14 into a logic voltage on data path DATI for data processor DP1. Resistor R11 and transistor Q1 form a transmitter 11 that controls the signal voltage applied by node 10 to data line 15. When the voltage on data path DATO provided by data processor DP1 is low (logical low), transistor Q1 cuts off and its impedance becomes very large. Resistor R11 has a value on the order of several thousand ohms, and attempts to pull data line 15 to near the voltage at terminal PT. When data processor DP1 provides a voltage on path DATO that is higher than a volt or two (logical high), transistor Q1 saturates and conducts strongly, pulling the voltage on line 15 to near 0 v.

Since transistor Q1 has a low saturated impedance, a logical high on path DATO causes transistor Q1 to pull the voltage at line 15 near 0 v. even if a large number of nodes 20, etc. connected to line 15 all have their transistors Q1 in their cut off state. Thus, a logical high on path DATO in any node 10, 20, etc. causes transistor Q1 to pull line 15 to 0 v., thereby applying the dominant bit value on line 15. All of the nodes 20, etc. with cut off transistors Q1 are transmitting a recessive bit value on line 15 that is overridden by any node whose transistor Q1 is saturated. While transmitting a signal on path DATO, data processor DP1 periodically monitors the signal on path DATI. If this signal on path DATO is recessive (i.e., high) while the signal on path DATI is dominant, this means that a node 20, etc. is transmitting a dominant bit value during this bit time. Data processor DP1 is programmed to stop further transmission of bit values when the signal on path DATI does not agree with the signal on path DATO. This process of continually testing by each transmitting node 10, 20, etc., as to whether the signal on line agrees with the signal that data processor DP1 is transmitting through transmitter 11, is called arbitration. One can see that as signal transmission continues in real time, more and more of any transmitting nodes 10, 20, etc. will stop transmitting as they lose arbitration by transmitting a recessive bit while another node 10, 20, etc. is transmitting a dominant bit. Eventually, a single transmitting node 10, 20, etc. wins arbitration and it will transmit to the end of its message.

Sensor 35 may comprise a temperature sensor, a fire detector, or any other type of sensor that detects an external condition. Some of these conditions are potentially dangerous and require the highest communication priority. For example, if a sensor detects fire, the node receiving that sensor's signal must immediately command a communication node to signal the fire department and command control nodes to shut down circulation and combustion devices. On the other hand, nodes may provide temperature values needed regularly for such things as control of a room temperature but whose transmission can be delayed for even several minutes without causing any serious problems. Such conditions often have inherent priority in terms of the order of communication from one node to another. The situation is similar for device 45. Some situations will require prompt communication by one node to another to control a device 45; others will not.

Each of these nodes includes a sync generator 39 that provides a sync signal to a data processor sync terminal 37. Each data processor DPI, etc. starts individual bit transmission times at the zero crossovers of the AC power wave. The sync generator 39 in each node 10, etc. provides a logic level sync signal to terminal 37 that changes state synchronously with these zero crossings. Since each of the nodes 10, etc. has identical sync generators 37 and the AC power all of the nodes 10, etc. receive is identically phased, each of the nodes 10, etc. will have identically bit start times. This allows for unambiguous arbitration.

Data processors DP1, DP2, etc. are conventional devices widely available as off-the-shelf items. Each data processor DP1, DP2, etc. has an internal instruction memory IM in which the instructions whose execution control operation of the data processor DP1, etc. and the node 10, 20, etc. are stored. Typically, instruction memories IM are non-volatile, meaning that normal operations are not capable of changing the individual instructions within an instruction memory IM. Each data processor DPI, etc. also has an alterable random access memory (RAM) having a number of data storage locations, each able to store several bytes of data. Only those locations needed to implement the invention are shown in FIG. 1. Two of these are a send register SR location that holds the message currently in the process of being sent on data line 15 and a send active flag (SAF) that when set indicates that the data processor holding the SAF is attempting to send a message.

A group of data storage or memory locations in the RAM of each data processor DP1, etc. form a send message queue SMQ. The send message queue SMQ holds individual messages to be sent on data line 15 to other of the nodes 10, 20, etc., but which have not yet been sent because of other data line 15 traffic. The format of the send message queue SMQ is as shown in FIG. 3 and its individual entries or memory locations have a format similar to that of individual messages shown in FIG. 2. In the example shown, the send message queue SMQ has 8 entries numbered 1 through 8. The messages in the send message queue SMQ are formed by data processor DP1, etc. while executing operating instructions. These operating instructions respond to data carried by other messages on data line 15, to signals provided by sensors and controlled devices, and to clock signals that indicate elapsing time in creating individual messages. However, an additional delay index DI field between the priority field (PR) and the DATA ID field is present. The delay index DI field for each entry is set by data processor instruction execution to hold a value equal to the number of times that a message other than in that entry has been sent since the message was placed in the send message queue SMQ. This mechanism will be explained in more detail in connection with software implementing the invention.

FIGS. 4*a*-4*d* form a flow chart describing the structure of software instructions whose execution cause the system to implement the invention. Those with familiarity in the software arts realize that first, software has a specific physical existence within the data processor that executes the software, and second, that the data processor itself becomes a functional element performing the programmed function while executing the software. As to the first point, the instruction memory has a physical structure that incorporates the unique combination of software instructions loaded into and readable from the memory and thereby uniquely defines its own structure. As to the second point, while the data processor is executing the instructions for any particular function, the processor becomes for that short period of time a physical functional element executing that function. As instruction execution continues, the data processor successively becomes the physical embodiment of each of the functional elements intended by the programmer. As a set of instructions for a particular function is re-executed, the processor can become that functional element as many times as is required. From this standpoint one can easily realize that a properly programmed data processor is a physical device in which an invention can easily be implemented. A microprocessor type of data processor implementation is often preferred to discrete or special purpose hardware because of cost savings to produce, relatively easy development, and ease of upgrade.

It is useful to generally discuss the flow charts of FIGS. 4*a*-4*d* and the two types of symbol boxes in them. These flow charts describe the functions of software stored in instruction memory IM of FIG. 1 and which implements various functions of node 10 including those of the invention. Each symbol box represents one or more microprocessor instructions. The lines with arrows connecting the boxes signify the order in which the instructions symbolized by the boxes are to be executed, with the flow of instruction execution following the direction of the arrowheads. Rectangular boxes as at 50 are activity elements. Hexagonal boxes as at 63 are decision elements and have two paths labeled "YES" and "NO" from them to two further symbol boxes. Decision element instructions test some mathematical characteristic of a specified variable. Depending on the test result, instruction execution can either continue in sequence or take a path to another symbol box specified by the results of that test. Here too, a decision element symbolizes one or more instructions that test the specified arithmetic or logical value and causes branching of the instruction execution depending on the result of that test.

As explained above, the instructions that an activity or decision element symbolizes cause the data processor to become during execution of those instructions, the functional equivalent of a physical device that performs the stated function. Accordingly, one can describe and claim the invention using terms describing these physical devices.

Note there may be many different specific embodiments of these physical devices that the data processor that all provide identical functionality. We wish to include all of these possible different embodiments in the definition of our invention.

The flow charts of FIGS. 4a-4d also have connector symbols as at 59 which designate a point in the software to which another instruction transfers instruction execution out of normal sequence. Connector symbols also indicate continuity from one FIG. to the next.

Execution of the instructions of activity element 50 in FIG. 4a starts the operation of the data processor DP1, etc. after AC power is applied across AC line 16 and common line 14. Hardware in each data processor D1, etc. causes an interrupt or branch to the first of the instructions of element 50 when power is first received. Executing the instructions of element 50 causes the data processor DP1 to clear the random access memory locations that are to store the SR, SMQ, and SAF. Next the instructions of activity element 53 are executed. These set an interrupt to occur after 500 μsec causing instruction execution to break sequence and begin with the instructions of activity element 73 (FIG. 4b).

A word about interrupts may be helpful. As is conventional, the preferred data processor DP1, etc. has time-based interrupt capabilities. An interrupt transfers instruction execution to a new, out-of-sequence interrupt instruction address in the instruction memory. The time to elapse before the next interrupt is set by storing a time value in an interrupt register associated with the interrupt instruction address. When the stored interrupt time has elapsed, the interrupt to the interrupt address occurs and the instruction stored there is executed. Before the interrupt instruction is executed after an interrupt, the data processor saves the contents of the control and arithmetic registers and the address of next instruction to be executed in normal sequence. When the interrupted-to software functions have been completed, then typically the contents of the control and arithmetic registers are restored and instruction execution resumes at the next instruction location. In this way the interrupt events are transparent to the operating functions. It is important that interrupt-critical instructions be completed before the next 500 μsec interrupt. Typically there are ways to lock out interrupts temporarily, but these issues are not germane to the invention, and will not be discussed further. We assume that all of the non-operating function instructions will complete their execution before the next 500 μsec interrupt occurs.

After the instructions for element 53 are executed, instruction execution continues through connector element A 59 to instructions that implement a group of operating functions shown within the dotted line box and generally labeled as operating functions 55. The term "operating function" or "operating functions" here refers to the various computational and decisional operations that any of the data processors DP1, etc. perform, including message generation and formatting and sensor and device communication and control, but excluding all of the various functions related to communicating with other nodes 10, 20, etc. Activity element 56 represents the instructions implementing the various communication and control functions related to operation and control of sensor 35 and device 45. These functions include reading sensor signals and device status, and providing control signals to devices 45. While only one activity element is shown here, it is intended to represent a wide variety of different software functions, both within a single node 10, as well as in any of the other nodes 20, etc. in a system. Activity element 60 symbolizes one or more groups of instructions that perform various computations and decisions using for example, data provided by the sensor 35 and device 45, information provided by other nodes, preprogrammed data, and passing of time as indicated by an internal data processor DP1 clock.

The elements 56 and 63 thus symbolize the software providing many individual activity and decision elements forming a part of operating functions 55. The details of the various computational and decisional functions of element 56 and 63 are for the most part not important to the invention itself. As mentioned earlier, these operating functions use messages communicated on data line 15, communications from various sensors 35 and devices 45, prestored information, and internally generated data such as the data processor clock to provide results of executing operating functions software.

Some sequences of the operating functions 55 instructions make decisions to send messages. The various sets of instructions that implement the various decisions to send messages are symbolized by decision element 63. If a test symbolized by decision element 63 requires no message to be sent, instruction selection passes through connector element 64 and execution begins again with the operating functions of element 56. If a decision element 63 determines that a message must be sent, the instructions symbolized by activity element 66 are executed to first find an empty SMQ location. (Dealing with a situation where the SMQ overflows is beyond the scope of this description.) The instructions of activity element 70 are then executed to cause the fields of the selected SMQ location to be filled with the appropriate values. The actual values loaded into the various fields of the selected SMQ location depend on the actual set of instructions that made the decision to send a message as well as information provided by executing the instructions of elements 56 and 60.

One component of the invention is an activity element 71 that functions as a priority value generator. Activity element 71 generates a numeric priority value for the message that is actually encoded as an internal signal in data processor DP1. The term "generate" here being used in the sense of determining a value. The value generated determines the order in which messages will win arbitration should a message collision occur. We define the priority level for a message to be higher with a larger numeric magnitude of the priority field value. Thus, a priority of 00 binary in the PR field will be lowest, and a priority of 11 binary will be highest. In some circumstances the particular priority value may be permanently assigned to the instruction set. On the other hand, the value may be derived computationally depending on the importance or potential inconvenience that results from a possible delay. The priority may even be increased if the message loses arbitration a number of times to other messages. For example, if the message is a command to a furnace or air conditioner to heat or cool a space, the priority may be set quite low if the temperature in that space is only slightly out of the control range, but higher if the temperature is far out of the control range. On the other hand, if the instructions symbolized by decision element 63 have detected loss of flame in a burner, the command to close the fuel valve must always have the highest priority (11 binary) because this is a safety-critical situation requiring the fuel valve to close as quickly as possible.

The calculations for priority values can be based on the information used and generated by elements 56 and 60, as well as on the instruction set executed as element 63 by which the decision to send a message was made. For example, the purpose of the message may decide the priority value for it. Or the value of the data in the data field may affect the priority value for the message.

Consider the following scenario: A first node detects that the signal from its temperature sensor 35 shows that the temperature in a space has become too low. At nearly the same time, a second node's sensor 35 shows that the relative humidity in that same space is too low. And at that same time a third node's device 45 detects that a person has requested entry to a facility by presenting an identity card to a reader. The third node must thus send a message to a fourth node requesting verification that the person can be allowed entry. The nodes may be preprogrammed for the third node's priority for the verification message to be set at 10 binary. The second node may set the priority for a message requesting increased relative humidity to be set at 00 binary. And priority of the first node's message requesting that the temperature be increased might be set at 01. The logic for these priorities is that the person requesting entry should be kept waiting for as short a time as possible. The first node assigns a priority of 01 to its message because a temperature that is too low is quite uncomfortable. And the second node assigns a priority of 00 to the message requesting additional humidity because humidity changes very slowly and isn't immediately uncomfortable if too low in any case. The highest priority, 11 binary, might be reserved for actual emergencies such as when a fire or intruder is detected. And if the temperature fell very far out of the control band, the node might assign a priority of 10 binary to the message requesting heating simply because the occupants of the space are no doubt becoming very uncomfortable.

After the priority value has been calculated, the instructions of activity element 72 are executed. Executing the element 72 instructions causes data processor DP1, etc. to function as a message priority module receiving the priority signal from the priority value generator. The element 72 instructions may also be any of a number of sets of instructions in the instruction memory IM. Typically the element 72 instructions comprise a number of sets of instructions, each of these sets associated with one of the sets of instructions symbolized by elements 56, 60, 63 and 71. The instructions of element 72 set the actual priority value in the priority field PR of the message in the selected send message queue SMQ location. As shown in FIG. 2, the priority field PR forms the two leading bits of each message, that is the first two bits of each message sent.

In a further scenario the priority value of a message already in the send message queue SMQ may be changed. Consider a system having a substantial amount of traffic, and hence collisions. Such a system may have a priority value generator that uses in part the number of times that other messages have prevailed over a particular message in the process for selecting which message is completely sent. The number of times that a message is passed over is measured by the delay index DI in the send message queue SMQ. The algorithm to determine priority can increment the current priority value by one if the associated delay index DI reaches some predetermined value. For example, if the current priority value is 01, this value might be set to 10 binary if the delay index DI value for the message in the SMQ reaches 16 decimal. In most cases, the delay index DI should be reset to 0 or at least some number near 0 if that message's priority value is increased.

The instructions of operating functions 55 continue to execute until eventually the 500 μsec interrupt occurs, causing the instructions of activity element 73 in FIG. 4b to execute. As explained above in connection with setting the 500 μsec interrupt, the instruction sequence that starts with the instructions symbolized by activity element 73 is executed each time the 500 μsec interrupt occurs. The instructions of element 73 reset the interrupt register to 500 μsec Next the instructions of activity element 75 sample and store the signal value transmitted from data line 15 by input interface 17 to data processor DP1 on input data path DATI.

The instructions of activity element 77 then compute a provisional or interim bit value for the current bit interval. In this system, the value of a bit in an interval is based on a sampling technique. Using the zero crossings of the AC voltage for synchronizing bit intervals among the nodes results in 120 bits/sec. or 8.33 ms. per bit interval, and in the range of about 13 to 18 500 μsec interrupts per bit interval. When the AC power voltage zero crossing signal from sync generator 39 (FIG. 1) indicating the end of the bit interval is detected (see decision element 80), the interim bit value becomes the final bit value.

Instruction execution then continues through connector element B 79 to decision element 80. As mentioned already, decision element 80 tests whether the AC sync signal at terminal 37 has changed since the last time this test was performed. If not, then the end of the bit interval has not yet occurred, and instruction execution proceeds through connector element C 84 to resume execution of operating functions 55 instructions immediately following the last instruction executed before the last 500 μsec interrupt.

If the AC sync signal has changed, then the bit interval is complete and the interim bit value becomes the final bit value. Then the instructions of decision element 82 test whether the send active flag SAF is set. If not, the node having the data processor in which the instructions for this element 82 have been executed is not sending a message, and hence no collision can occur. In this case instruction processing continues with the decision element 83 which tests whether the end of the message has been reached. Typically, the data length field held within byte 4 of each message is used to determine when the end of the message has been reached. Again, this is not germane to this invention. If the end of the message has not been reached, instruction processing resumes in the operating functions instructions 55 through connector element B 84. If the end of the message is detected, then the instructions of activity element 86 are executed to process the new message. Processing of the new message will usually include error testing using the CRC field of the message. Certain of the element 86 instructions may also form a part of the operating functions 55 instructions. How these instructions are classified is not important to understanding this invention. At any rate, after whatever message processing in element 86 is complete, processing of the operating functions 55 instructions again resumes through connector element 84.

If the node is sending or attempting to send a message, decision element 82 transfers instruction processing to decision element 92, which test for a message collision by comparing the bit value sensed for the just-ended bit interval with the bit in the send register SR that has just been sent. If the bit values are not equal, then a collision has occurred, and the instructions of activity element 98 are executed. The element 98 instructions clear the send active flag SAF. Then instruction processing returns to operating functions 55 instructions through connector element C 84.

If no collision is detected by decision element 92, then the instructions of decision element 95 are executed, to determine if the last bit of the message has been sent. If the last bit has been sent, the data processor DP1, etc. generates an end of message signal, and then executes the instructions of activity element 106 to clear the send active flag SAF and to clear the just-sent message from the send message queue SMQ. Then responsive to the end of message signal, the instructions of activity element 102 are executed, which increment by 1 the delay index DI in each active message waiting in the send message queue SMQ to be sent. (Those skilled in the software arts understand that increments of 1 are purely arbitrary, and that the purpose is simply to record the number of times each delay value is incremented. One could as easily decrement by 1 an originally maximum number prestored in each delay index at the time its associated message is first created in the send message queue SMQ.) The instructions of element 102 form an incrementer for the delay index DI of each active entry in the send message queue SMQ. After the instructions of element 102 have been executed, the value of the delay index DI in each memory location of the send message queue SMQ indicates the number of times the sending of the message in that memory location has been deferred in favor of some other message. That is, each delay index DI indicates with quite good (but not perfect) accuracy the number of other messages that have been sent since the delay index's message entered the send message queue SMQ. Then processing transfers to connector element D 89 to prepare for sending another message if the send message queue SMQ is not empty.

If the end of the message has not yet been reached, the instructions of activity element 109 are executed to increment the SR bit pointer to point to the next bit in the send register SR. The instructions of activity element 111 cause data processor DP1 to place a voltage on the output path DATO that sets the impedance of transistor Q1 in transmitter 11 to the value, high or low, that is specified by the send register SR bit specified by the SR bit pointer. In this embodiment a high voltage on output data line DATI causes transistor Q1 to conduct, pulling the voltage on data line 15 to near 0 v., which is the dominant signal voltage for purposes of arbitration and is represented as a binary 1. Because binary 1's are treated as the dominant value, this means that every bit value of 1 in the send register SR cause transistor Q1 to conduct during its bit transmission interval. Of course, these selections are arbitrary, and can be altered in a number of ways without affecting operation of the system. Then processing transfers through connector element C 84 to resume in the operating functions 55 instructions at the point where the last 500 µsec interrupt occurred.

If decision element 95 detects the end of the message, then the instructions of activity element 106 are executed, which clear the send active flag SAF and delete the just-sent message from the send message queue SMQ. Instruction execution then continues through connector element D 89 to decision element 117 of FIG. 4d.

Figure 4C:
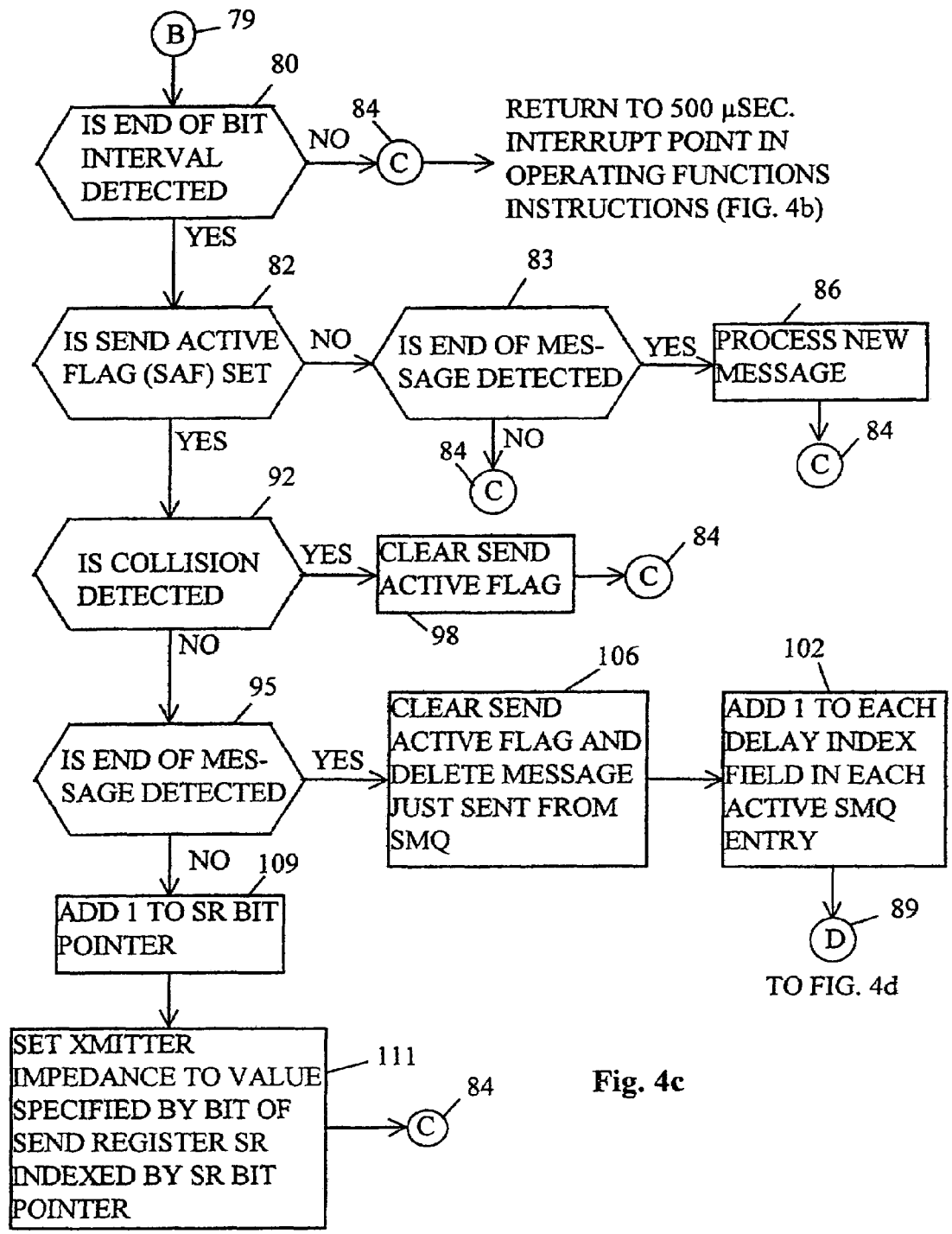

Decision element 117 tests whether the send message queue SMQ holds any messages to be sent. If not, then instruction processing transfers through connector element C 84 (FIG. 4c) to resume executing operating functions 55 instructions (FIG. 4a). If the send message queue SMQ holds one or more messages to be sent, decision element 117. This action can most easily be taken during the search of the send message queue SMQ by decision element 117 instructions. Then the instructions of activity element 120 delay further processing for a standard spacing interval between adjacent messages.

The instructions of activity element 123 are executed next; these select the active message in the send message queue SMQ with the largest numeric magnitude (leftmost bit having the highest significance) and store this message in the send register SR. Entries in the send message queue SMQ are organized with the priority field PR having the highest numeric significance and the delay index DI field having the next highest numeric significance. The priority field PR encodes higher priorities with larger numeric magnitudes.

The delay index field DI value in each send message queue SME entry indicates the number of times its entry has been passed over for sending, either because it lost arbitration or a message in its own send message queue had higher priority. By using numeric magnitude of the combined priority and delay index fields with the priority field PR having the higher significance, selecting the largest in numeric magnitude of the active entries in the send message queue SM, the entry selected will be the entry with highest priority field PR magnitude that has been passed over for the largest number of times. In many situations this is the most logical and effective way to deal with backed up demands for sending a number of messages. We prefer while executing the instructions of element 123 to remove the delay index field DI when loading the selected send message queue SMQ entry into send register SR. In certain systems, it may be preferable to include the delay index field DI within the message in the send register SR where it can resolve arbitration with other nodes' messages in a logical way. At this time we do not prefer this approach.

The instructions of activity element 127 set the send active flag SAF to indicate that the send register SR holds a message to be sent. The element 127 instructions also clear the SR bit pointer to indicate the most significant bit, bit 1, of the message as the first bit to be sent on data line 15. Finally, the instructions of activity element 131 send a start bit serving as a preamble for the message to be sent. The start bit helps to synchronize the individual nodes with each other for the message-sending activity. Each node 10, etc. is programmed to send the identical start bit, so there is no information content in the start bit itself, other than it indicates that a message is to follow. The start bit can thus be ignored as far as message arbitration is concerned, and the message may be considered to start with the highest order (most significant) bit having information content which in the preferred embodiment is the high order bit of the priority field. Instruction processing then transfers through connector element C 84 (FIG. 4c) to resume execution of operating functions 55 instructions (FIG. 4a).

I claim:

1. A node operable in a data processing arrangement including a plurality of the nodes that are capable of communicating with one another via a serial bus, the node comprising:

a send register for storing a message for transmission on the serial bus, wherein the message comprises at least a data ID including a content identifier inherently exhibiting a first bus arbitration priority, wherein the content identifier represents a pre-assigned priority of the message content;

a message priority module configured to store a variable bus arbitration priority contiguous with the data ID of the message, wherein the variable bus arbitration priority is computationally adjustable by the node to change the pre-assigned priority of the message content; and a transmitter coupled to the message priority module to receive the message, and to serially transmit onto the serial bus the message as dominant and recessive signal levels in a bit format ordered from the variable bus arbitration priority to the first bus arbitration priority, wherein the data processing arrangement grants serial bus access to a selected one of the plurality of nodes having the highest first bus arbitration priority, if the variable bus arbitration priorities of the plurality of nodes do not differ.

2. The node as in claim 1, further comprising a monitor circuit coupled to the serial bus to monitor dominant and recessive signal levels on the serial bus, and configured to disable further transmission of the message if a dominant signal level is present on the serial bus when a recessive signal level is being transmitted by the node onto the serial bus.

3. The node as in claim 2, wherein the monitor circuit comprises:
an input interface coupled to the serial bus and configured to convert the dominant or recessive signal level on the serial bus to a logic state; and
a data processor coupled to the input interface to receive the logic state and to disable further transmission of the message if the logic state represents a dominant signal level when a recessive signal level is being transmitted by the node onto the serial bus.

4. The node as in claim 2, wherein the monitor circuit is further configured to enable further transmission of the message if a dominant signal level is present on the serial bus when a dominant signal level is being transmitted by the node onto the serial bus.

5. The node as in claim 4, wherein the monitor circuit comprises:
an input interface coupled to the serial bus and configured to convert the dominant or recessive signal level on the serial bus to a logic state; and
a data processor coupled to the input interface to receive the logic state and to enable further transmission of the message if the logic state represents a dominant signal level when a dominant signal level is being transmitted by the node onto the serial bus.

6. The node as in claim 1, wherein the variable bus arbitration priority represents a relative priority to access the serial bus by a relative placement of dominant bits corresponding to dominant signal levels.

7. The node as in claim 6, wherein the dominant bits placed in more significant bits of the variable bus arbitration priority represent higher relative priorities than the dominant bits placed in less significant bits of the variable bus arbitration priority.

8. The node as in claim 1, wherein the first bus arbitration priority represents a relative priority to access the serial bus by a relative placement of dominant bits corresponding to dominant signal levels.

9. The node as in claim 8, wherein the dominant bits placed in more significant bits of the first bus arbitration priority represent higher relative priorities than the dominant bits placed in less significant bits of the first bus arbitration priority.

10. The node as in claim 1, further comprising a priority value generator coupled to the message priority module to generate the variable bus arbitration priority for use by the message priority module in storing the variable bus arbitration priority contiguous to the data ID.

11. The node as in claim 10, wherein the priority value generator is configured to dynamically modify the variable bus arbitration priority based on a condition sensed via the data processing arrangement.

12. The node as in claim 11, wherein the condition sensed via the data processing arrangement comprises determining the node has lost arbitration a predetermined number of times.

13. The node as in claim 11, wherein the condition sensed via the data processing arrangement comprises determining that a control range of the data processing arrangement has been exceeded.

14. The node as in claim 1, wherein variable bus arbitration priority comprises two priority bits.

15. The node as in claim 14, wherein the variable bus arbitration priority comprises two priority bits representing priorities ranging from a lowest priority of binary 00 and a highest priority of binary 11.

16. The node as in claim 1, wherein a highest priority value of the variable bus arbitration priority is reserved for a safety-critical situation.

17. A system for enabling a plurality of nodes to arbitrate for access to a serial bus by which the nodes communicate, comprising:
(a) a sending node comprising:
(i) a send register for storing a first message for transmission on the serial bus, wherein the first message comprises at least a data ID including a content identifier inherently exhibiting a first bus priority, wherein the content identifier represents a pre-assigned priority of the message content;
(ii) a message priority module configured to store a variable bus priority contiguous with the data ID of the first message, wherein the variable bus arbitration priority is computationally adjustable by the sending node to change the pre-assigned priority of the message content;
(iii) a transmitter coupled to the message priority module to receive the first message, and to serially transmit onto the serial bus the message as dominant and recessive signal levels in a bit format ordered from the variable bus priority to the first bus priority; and
(b) a receiving node comprising a monitor circuit coupled to the serial bus to monitor the dominant and recessive signal levels on the serial bus, and configured to disable further transmission of a second message being transmitted from the receiving node if a dominant signal level is present on the serial bus when a recessive signal level is being transmitted by the receiving node onto the serial bus, wherein, if the variable priorities of the respective first and second messages differ, the sending node and the receiving node grant serial bus access to the sending node or the receiving node having the highest variable bus priority in the respective first and second messages, and if the variable priorities of the respective first and second messages do not differ, the sending node and the receiving node grant serial bus access to the sending node or the receiving node having the highest first bus priority in the respective first and second messages.

18. A method, comprising:
assembling a message at a source node, wherein the message includes at least a data ID field for providing a content identifier inherently exhibiting a first bus priority, wherein the content identifier represents a pre-assigned priority of the message content, the message further including a priority field for providing a variable priority, wherein the variable bus arbitration priority is computationally adjustable by the node to change the pre-assigned priority of the message content, and wherein the priority field is assembled immediately preceding the data ID field in an order from leading bits to trailing bits;
transmitting the assembled message bit by bit from the source node onto a serial bus as dominant and recessive signal levels in a bit format ordered to transmit the priority field immediately prior to the data ID field in the order from leading bits to trailing bits;
monitoring the dominant and recessive signal levels on the serial bus;
disabling further transmission of the message from the source node if a dominant signal level associated with the variable priority of at least one or more recipient nodes is present on the serial bus when a recessive signal level associated with the variable priority of the source node is being transmitted onto the serial bus; and if the variable priorities of the source node and the one or more recipient nodes differ, granting access to the serial bus to the source node or the recipient node having the highest variable priority, and if the variable priorities of the source node and the one or more recipient nodes do not differ, granting access to the serial bus to the source node or the recipient node having the highest first bus priority.

19. The method of claim 18, further comprising arranging a plurality of the messages available for transmission from the source node onto the serial bus into a transmission order dependent on the variable priority.

20. The method of claim 19, wherein arranging a plurality of the messages comprises arranging the plurality of the messages into a transmission order from a highest variable priority to a lowest variable priority, and further comprising transmitting the plurality of messages according to the transmission order.

21. The method of claim 18, farther comprising dynamically modifying the variable priority based on a condition sensed via the serial bus.

22. The method of claim 21, wherein the condition sensed via the serial bus comprises determining the source node has lost arbitration a predetermined number of times.

23. The method of claim 21, wherein the condition sensed via the serial bus comprises determining that a control range has been exceeded.

24. The method of claim 18, wherein a highest priority value of the variable priority is reserved for a safety-critical situation.

* * * * *

UNITED STATES PATENT AND TRADEMARK OFFICE
CERTIFICATE OF CORRECTION

PATENT NO. : 7,664,133 B2  Page 1 of 1
APPLICATION NO. : 11/316122
DATED : February 16, 2010
INVENTOR(S) : Steven C. Nichols It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 849 days.

Signed and Sealed this

Thirtieth Day of November, 2010

David J. Kappos
*Director of the United States Patent and Trademark Office*